Sept. 9, 1952            C. H. WATSON            2,609,649
HYDRAULIC ADJUSTING MECHANISM FOR HARVESTING MACHINES
Filed Aug. 15, 1949            2 SHEETS—SHEET 2
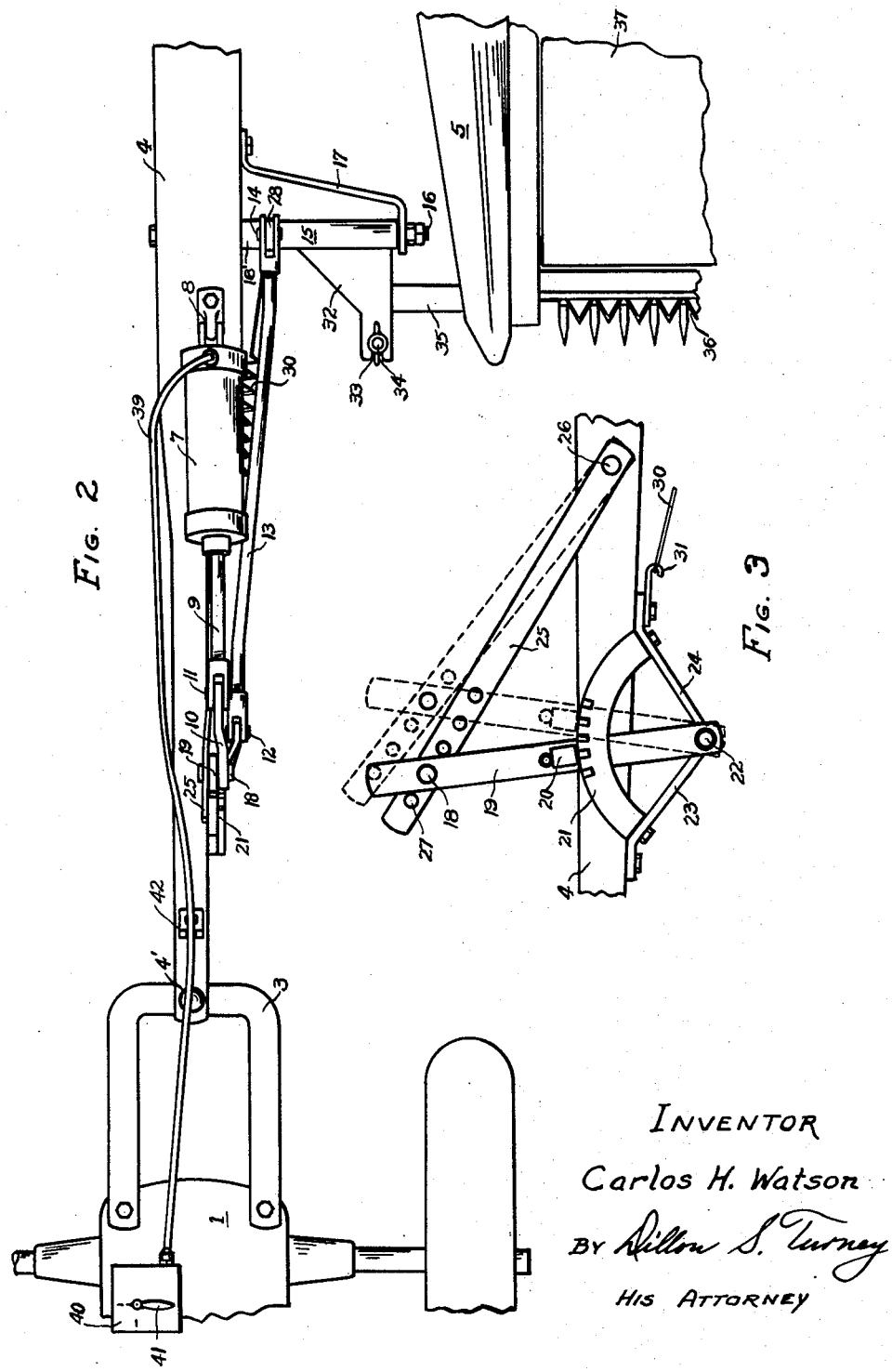
INVENTOR
Carlos H. Watson
BY Dillon S. Turney
HIS ATTORNEY

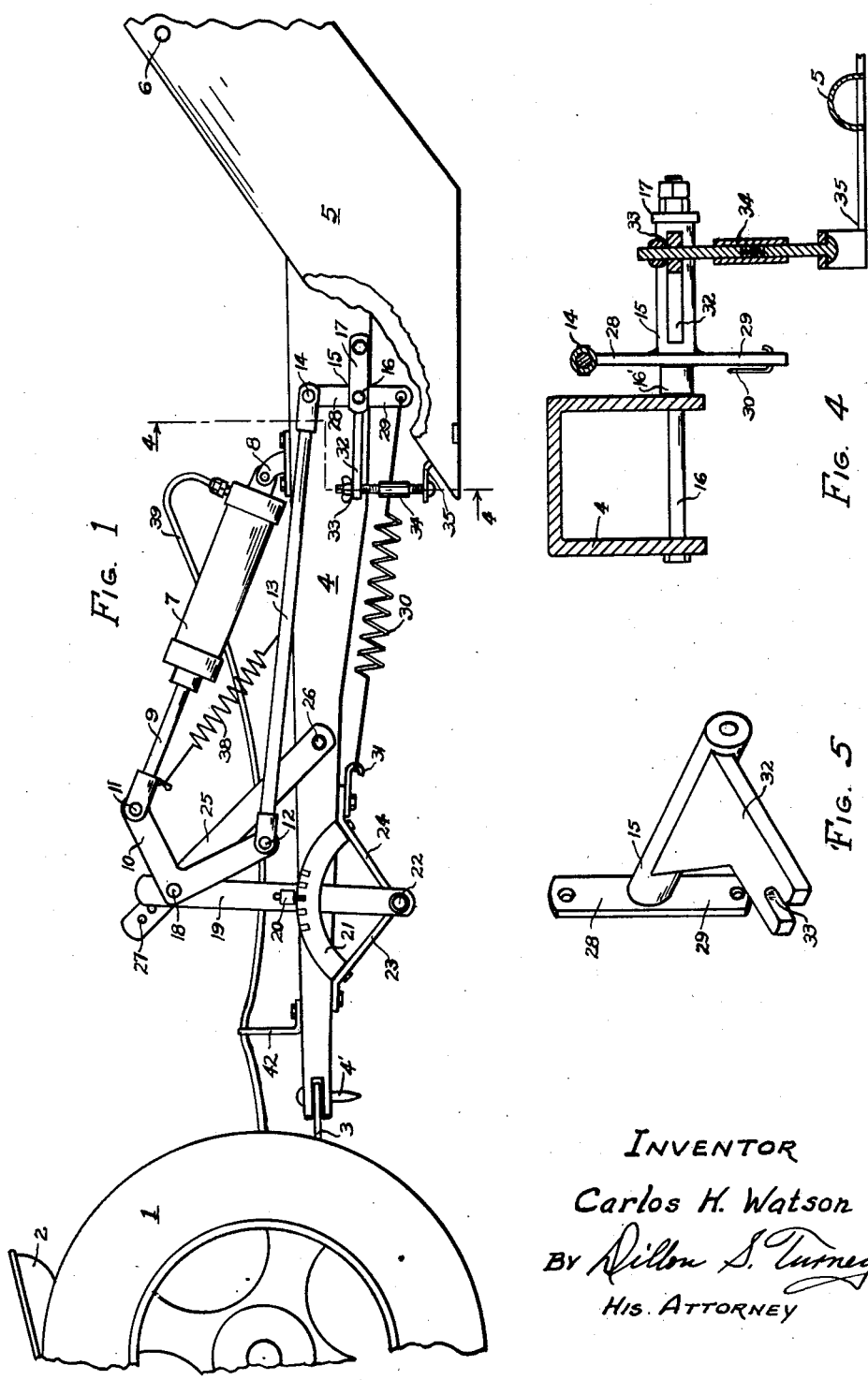

Patented Sept. 9, 1952

2,609,649

UNITED STATES PATENT OFFICE 2,609,649

HYDRAULIC ADJUSTING MECHANISM FOR HARVESTING MACHINES

Carlos H. Watson, Richland, Iowa

Application August 15, 1949, Serial No. 110,436

3 Claims. (Cl. 56—15)

This invention relates to tractor-drawn farm implements in general and more particularly to hydraulic operating mechanisms for farm implements of the combine or corn picker type.

It is well known that hydraulic operating devices have been previously applied to perform various operating functions on tractor-drawn farm machinery, and in most cases improved operation has resulted and the physical strain and fatigue of the operator has been greatly reduced. The operator of a tractor-drawn combine or mechanical corn picker must steer and regulate the speed of the tractor as well as maintain a constant watch on the implement trailing behind to make certain that the cutting or harvesting operation is being satisfactorily performed. This involves manipulation of the hand operated control lever with which such implements are provided to raise and lower the cutting head on the combine or the gathering assembly on the corn picker to adjust for unevenness of the ground over which the instrument is passing, or to reset the height of the cutting head or gathering assembly for various heights of grain or field crop being harvested. This requires almost constant attention and continuous operation of the manually operated control lever which, even under the most favorable conditions, is placed on the implement rearwardly of the operator and in a most awkward and fatiguing position for safe and efficient operation.

It is, therefore, an object of this invention to provide a new and improved tractor-drawn implement of the combine or harvester type.

It is a further object of this invention to provide an improved hydraulic operating mechanism for tractor-drawn implements such as corn pickers and combines.

It is another object of this invention to provide hydraulic operating means for continuously and precisely adjusting the height of the grain cutting or gathering member on tractor-drawn implements.

It is still a further object of this invention to provide hydraulic operating means for raising and lowering the grain cutting or gathering member of tractor-drawn implements and to provide means for resetting the range of such raising and lowering function in a simple and efficient manner.

It is also an object of this invention to provide a hydraulic operating mechanism for a tractor-drawn implement that is rugged, inexpensive, easily applied to existing farm implements, and which greatly reduces the fatiguing duties of the operator.

In accordance with the present invention, I have provided a hydraulic operating cylinder which, through a linkage consisting of a bell crank and push rods, operates to raise and lower the grain cutting or gathering member of a tractor-drawn farm implement. The hydraulic operating assembly is mounted on the draw bar of the implement and the pivot or fulcrum of the bell crank is also adjustable so that the range of raising and lowering operations may be reset at the will of the operator to vary the maximum and minimum heights through which the hydraulic operating mechanism functions.

This invention will be better understood from the following description taken in connection with the accompanying drawings and its scope will be pointed out in the appended claims.

In the drawings, Figure 1 illustrates a side elevation view of the invention as applied to the draw bar of a tractor-drawn farm implement such as a corn picker or combine. Figure 2 is an enlarged plan view of the invention applied to the draw bar of the tractor-drawn implement, specifically a combine, which is only partially shown. Figure 3 is a detail of a portion of the invention showing the resetting adjustment for the hydraulic linkage. Figure 4 is an enlarged sectional view of a part of the implement taken along the lines 4—4 of Figure 1; and Figure 5 is an enlarged perspective view of the 3-way lever member which transmits the raising of the lowering force to the grain cutting or gathering assembly.

Referring now to the drawings, and particularly to Figure 1 with occasional reference to Figure 2, there is shown, in part only, a conventional farm tractor 1 which is provided with the operator's seat 2 and draw bar 3. In trailing behind position is the implement which may be of the combine or corn picker type and is provided with the main draw bar 4 which is connected to the tractor draw bar by means of the clevis and pin 4'. Such machines usually receive their operating power from the power take-off shaft of the tractor, but since it forms no part of the present invention, the power take-off shaft which usually extends parallel to and within or underneath the draw bar 4, has not been shown. The corn picker gathering assembly or combine cutting head has been schematically shown at 5 and such members are customarily pivoted rearwardly at or near the point 6 for rotational movement up or down with respect to the ground.

The hydraulic operating cylinder 7 is pivoted to the bracket 8 which is secured to the upper side of the draw bar 4, and the cylinder 7 is provided with an inner piston and extending push rod 9 which is connected to the upper arm of the bell crank 10 by means of the pin 11. The lower arm of the bell crank 10 is similarly connected by the pin 12 to the push rod 13 which, at its extreme right end, is pivoted at 14 to the upper arm of the three-way lever 15. As shown best in Figures 2 and 4, the three-way lever 15 is secured for rotary movement with respect to the draw bar 4 by means of the through shaft 16 and the brace 17. A spacer 16' is used to position the lever 15 a suitable distance from the draw bar 4.

The bell crank 10, it will be noted, is pivoted at the point 18 to the upright lever 19 which is movable through a limited front-to-rear arc and may be locked in any of a number of positions on such arc by means of the pawl or ratchet assembly 20 which can be engaged with any of the notches in the arcuate rack or sector 21. The lower end of the lever 19 is pivoted for such movement at the point 22 which point is rigidly maintained by means of the braces 23 and 24 extending from the draw bar 4. In some cases it may be desirable to stiffen the lever 19 and bell crank 10 assembly once the desired operating notch in the rack 21 has been selected, and a straight brace 25 is provided which is secured to the draw bar 4 at the point 26 and which is provided with holes 27 which correspond with the notches in the rack 21 so that the lever 19 may be securely locked in the position corresponding to any selected notch. This adjustment will be quickly understood by reference to Figure 3 in which the assembly is shown, in heavy outline, as being locked in a forward notch of the arc of the rack 21, and shown in dotted line position as being set in one of the rearward notches of the rack 21. Thus it will be noted that the pivot or fulcrum 18 of the bell crank 10 is moved forward or backward as the case may be, and the maximum and minimum end positions of the cutting head assembly 5 are adjusted correspondingly.

As shown in Figure 1, the three-way lever 15 consists of a vertical lever member having an upper arm 28 which is connected to the push rod 13 at the point 14 and a lower arm 29 which is engaged by one end of the heavy tension spring 30, the opposite end of the spring 30 being connected to the draw bar 4 by means of the hook 31. The horizontal or lifting arm 32 of the three-way lever 15 is secured to the main body of the lever 15, and extends substantially horizontally in a normal operating position and is provided with a notch or recess 33 at its extreme outer end for engagement with the turnbuckle assembly 34. The adjustable turnbuckle interconnects the three-way lever 15 to the lifting ear 35 which in turn is secured to the corn picker gathering assembly or combine cutting head 5. For example, in Figure 2, the combine cutting head 5 is partially shown and includes a sickle bar 36, and canvas conveying belt 37.

It should be emphasized that the tension spring 30 which is at all times in a stretched condition exerts a force on the lever 15 which opposes the weight of the gathering assembly or cutting head 5 around its pivot 6, and substantially counterbalances the assembly thereby reducing the amount of force which must be exerted by the hydraulic cylinder 7 in raising the assembly 5 against the force of gravity. It is believed that the arrangement and operation of the three-way lever 15 will be readily understood by reference to Figures 2 and 4 which show the relationship of the parts on a somewhat larger scale than is shown in Figure 1.

A second tension spring 38 is interconnected between the upper end of the hydraulic push rod 9 and the draw bar 4 and exerts a force opposing the action of the hydraulic cylinder which assists in returning the cylinder to the closed or inoperative position, thereby driving the hydraulic oil out of the cylinder and returning it to the hydraulic system on the tractor.

In Figure 2, it will be noted that the entire hydraulic operating assembly and linkage is compactly mounted and carried on the upper side of the draw bar 4. The hydraulic cylinder 7 is connected by means of the hose 39 to the hydraulic control valve 40 which is schematically shown as mounted below the operator's seat 2 on the tractor frame. In Figure 2, the operator's seat has been omitted to show the position of the control valve, but it will be understood by those familiar with such machinery that such control valves may take a variety of forms on various makes of tractors, but essentially are a simple on-off valve arrangement with an operating handle 41 movable between an "on" and an "off" position and which, at any point intermediate, will proportion the amount of hydraulic pressure supplied by the hydraulic pump, not shown, on the tractor to the hydraulic cylinder 7. In order to prevent damage to the oil pressure hose 39, an upright bracket 42 is secured to the draw bar 4 to maintain the hose elevated above the draw bar and to prevent contact with brush or the field crop in which the machinery is being operated.

In the operation of the system, it is to be observed that in Figure 1 the parts are shown in the lowered or at-rest position, that is, the gathering assembly or cutting head 5 is in the lowermost position for the particular adjustment of the lever 19 on the rack 21 and the hydraulic push rod 9 of the cylinder 7 is at its extreme closed or inactive position. Upon manipulation of the hydraulic valve 41, oil pressure will enter the cylinder 7, forcing the push rod 9 forwardly and rotating the bell crank 10 about the pivot 18 in a counter-clockwise position. This, in turn, will actuate the push rod 13 rearwardly thus rotating the three-way lever 15 in a clockwise direction which will raise the arm 32 of this lever thereby raising the outer end of the assembly 5. The amount of lift of the assembly 5 will depend on the position of the control valve 41 and, as long as the valve is maintained in one particular position, the assembly 5 will also be maintained in a corresponding raised position. When the control valve 41 is returned to the off position, the weight of the gathering assembly or cutting head 5, plus the force of the spring 38, will force the oil from the cylinder 7 and return the mechanism to the lowered or at-rest position.

The normal or at-rest position of the linkage and assembly 5 is reset or changed by means of the rack 21 and pawl 20 adjustment earlier described in connection with Figure 3, and, if the stiffening brace 25 is in use, the operator is required to change only one bolt, the pivot pin 18, which, upon moving the lever 19 forward, will lower the normal or at-rest position of the gathering assembly or cutting head 5 and, of course, will also reduce correspondingly the maximum height to which this assembly can be raised under hydraulic operation. Moving the lever 19 a notch to the rear will raise the normal or at-rest position of the assembly 5 such as might be desired when harvesting tall grains or when traversing rough or rocky ground. This, of course, correspondingly raises the maximum lift position of the cutting head assembly 5.

This apparatus has been constructed with the principles of safety, ease of operation, and simplicity in mind since, it will be noted, that in case of failure of the hydraulic system, a normal or at-rest position is always obtained and a failure during operation will only mean that the assembly 5 will return to the normal position. Another advantage is found that in case of a failure that cannot be quickly repaired or corrected, the lever 19 may be used as a manual operating lever by disconnecting the brace 25 and working the lever 19 by hand relying on the pawl 20 and rack 21 to maintain the cutting head assembly 5 in the desired fixed position. Of course, this lacks the flexibility and ease of operation as under hydraulic control, but will permit harvesting to continue until repairs can be made. It should be understood that while the system has been shown as applied to a tractor-drawn corn picker or combine, there are undoubtedly other farm implements to which it may be easily adapted. It should also be understood that some of the details of the tractor and the implement per se have not been illustrated or described such as the gathering assembly construction for combines since they will vary from one manufacturer's type of machine to another. However, it is important to observe that the elements of this invention as illustrated are equally applicable to most machines of this nature and it may be readily applied to existing equipment in a very short time by the average mechanic, and requires nothing in the way of special tools or complicated structural changes to the basic farm implement.

While there have been shown and described particular embodiments of this invention, it will be obvious to those skilled in the art that various changes and modifications can be made therein without departing from the invention and, therefore, it is intended in the appended claims to cover all such changes and modifications as fall within the true spirit and scope of this invention.

What I claim as new and desire to secure by Letters Patent of the United States is:

1. A hydraulic operating mechanism for the grain harvesting assembly of a tractor-drawn farm implement comprising, a main draw bar on said implement connected to said tractor, a vertically movable harvesting assembly pivoted to said draw bar on a horizontal axis, a fluid power device mounted on said draw bar, power transmission means linking said fluid power device and said harvesting assembly, said assembly including a bell crank pivoted to said fluid power device and a three-way lever pivoted to one end of said bell crank and mounted transversely of said draw bar, a shiftable fulcrum member having a ratchet means for presetting its position relative to said draw bar in said power transmission means for varying the range of vertical movement of said harvesting assembly, and tension spring means associated with said draw bar and said harvesting assembly arranged to assist said fluid power device in operating said assembly.

2. In combination with a tractor having a power source and a farm implement connected in trailing relationship thereto, a main draw bar on said implement, a vertically movable grain collecting assembly on said main draw bar, a fluid power device mounted on said draw bar, control means interconnecting said fluid power device and said tractor power source for controlling the operation of said fluid power device, a mechanical linkage interconnecting said fluid power device and said assembly for raising said assembly with respect to the earth, said linkage including a bell crank mounted on a shiftable lever carried by said draw bar, lost motion means interposed between said linkage and said assembly, manually operated means including a toothed sector and ratchet for shifting said lever and said bell crank as a unit in a plane parallel to said draw bar to vary the maximum and minimum operating positions of said assembly, and spring means interconnecting said assembly and said draw bar and exerting force in a direction to oppose the effect of gravity on said assembly.

3. In combination with a harvesting machine having a draw bar for attachment to a source of motive power, a hydraulically operated power mechanism for controlling the operation of said machine comprising, a hydraulic operator positioned above and pivoted to said draw bar, a shiftable lever pivoted to said drawbar and forward of said operator and in alignment therewith, a bell crank pivoted to said lever for rotation by said operator, a three-way lever arranged transversely of said draw bar and rearwardly of said operator and said lever, a push rod interconnecting said bell crank and said three-way lever, a lost motion link interconnecting said three-way lever and said harvesting machine, and spring means partially counterbalancing the weight of said harvesting machine and interposed between said three-way lever and said draw bar.

CARLOS H. WATSON.

REFERENCES CITED

The following references are of record in the file of this patent:

UNITED STATES PATENTS

| Number | Name | Date |
| --- | --- | --- |
| 2,081,346 | Altgelt | May 25, 1937 |
| 2,269,982 | Mott | Jan. 13, 1942 |
| 2,325,870 | Mott | Aug. 3, 1943 |
| 2,328,838 | Oberlink | Sept. 7, 1943 |
| 2,387,070 | Hilblom | Oct. 16, 1945 |
| 2,452,153 | Ronning et al. | Oct. 26, 1948 |
| 2,489,065 | Whited | Nov. 22, 1949 |